United States Patent [19]

West et al.

[11] Patent Number: 5,068,893

[45] Date of Patent: * Nov. 26, 1991

[54] TELEVISION SIGNAL PROCESSING NETWORK FOR SUBSCRIPTION TELEVISION JAMMING SIGNALS

[75] Inventors: Lamar E. West, Maysville; William P. Lafay, Snellville; Majid Ghanouni, Marietta; Alex M. Cook, Jr., Lawrenceville, all of Ga.

[73] Assignee: Scientific Atlanta, Inc., Atlanta, Ga.

[ * ] Notice: The portion of the term of this patent subsequent to May 31, 2005 has been disclaimed.

[21] Appl. No.: 192,062

[22] Filed: May 9, 1988

Related U.S. Application Data

[63] Continuation-in-part of Ser. No. 926,749, Nov. 4, 1986, Pat. No. 4,748,667.

[51] Int. Cl.$^5$ .................... H04N 7/167; H04K 3/00; H03H 9/00
[52] U.S. Cl. .......................... 380/7; 333/155; 333/176; 333/193; 455/1; 455/286; 455/339
[58] Field of Search ............... 380/7; 455/1, 286, 339; 333/155, 176, 193

[56] References Cited

U.S. PATENT DOCUMENTS

| | | | |
|---|---|---|---|
| 3,898,375 | 8/1975 | Hannan et al. | 380/7 |
| 4,074,311 | 2/1978 | Tanner et al. | 358/118 |
| 4,126,837 | 11/1978 | Koyamada et al. | 333/196 |
| 4,257,065 | 3/1981 | Papay . | |
| 4,268,860 | 5/1981 | Blonder | 380/7 |
| 4,461,032 | 7/1984 | Skerlos | 455/4 |
| 4,577,168 | 3/1986 | Hartmann | 333/193 |
| 4,598,312 | 7/1986 | Geissler | 358/118 |
| 4,663,664 | 5/1987 | Ragan | 380/16 |
| 4,748,667 | 5/1988 | Farmer et al. | 380/7 |

*Primary Examiner*—Stephen C. Buczinski
*Attorney, Agent, or Firm*—Martin LuKacher

[57] ABSTRACT

Networks which remove the jamming signal from the television signal supplied to subscribers for a premium T.V. channel in a cable (CATV) or other subscription television system utilizes surface accoustic wave (SAW) devices arranged to provide a broadband all pass response across the entire band covered by all of the transmitted television channels except for a notch at the frequency of the jamming signal. The narrow band response of the filter in the premium channel is such that the notch presents insertion loss at the jamming signal frequency and over a frequency range to accommodate shifts in the frequency response of the SAW devices with respect to the frequency of jamming signal, which insertion loss is about 100 times the insertion loss at the picture carrier frequency of the television signal, even though the picture carrier and the jamming signal frequency may be within about 200 KHz apart from each other. The network includes circuit elements which utilize the characteristics of the SAW devices to create a filter network which has a transmission null (notch) at the frequency of the jamming signal.

18 Claims, 2 Drawing Sheets

TELEVISION SIGNAL PROCESSING NETWORK FOR SUBSCRIPTION TELEVISION JAMMING SIGNALS

This application is a continuation in part of U.S. patent application Ser. No. 926,749 filed Nov. 4, 1986 for Jamming Signal Scrambling and Descrambling Systems for CATV, this application issued as U.S. Pat. No. 4,748,667 on May 31, 1988.

The present invention relates to improved networks for removing jamming signals from premium channel subscription television signals, and particularly to networks including surface acoustic wave (SAW) devices for such purpose.

The invention is especially suitable for use at subscriber locations where the jamming signals, sometimes referred to as jamming carriers, are in close proximity to the picture carrier of the television signal, and particularly where the jamming carrier is located at a frequency which is substantially at the frequency of one of the nulls in the spectrum of the modulation of the picture carrier by the horizontal sync signals, as described in U.S. Pat. No. 4,748,667, issued May 31, 1988, which resulted from the above referenced application.

As described in the above referenced patent, it is desirable to provide minimum attenuation (insertion loss) except in a notch in the frequency response of the jamming signal removal network where the jamming signal is located. To this end, SAW devices, which may also be referred to as SAW resonators or elements, or impedance elements, are embedded in an all pass network where the SAW device is located between the input and output (input and output ports or terminals) of the network. Transmission paths are provided such that the signals through one path are balanced or cancelled by signals which are transmitted through an additional path through the network. The balancing or cancellation of the signals result in the notch in the frequency response of the network. How well the signals in both paths match determines the depth of the notch (the insertion loss) of the network on a narrow band basis.

When the jamming signal and picture carrier are closely adjacent in frequency, the narrow band response of the network must be such that the insertion loss at the picture carrier due to the network is minimal. In other words, the skirts of the notch must be very steep. It has been found in accordance with this invention that the insertion loss at the jamming carrier should be about 100 times greater than the insertion loss at the picture carrier. In order to prevent profound degradation of the television picture from jamming signals which leak through the network, the relative difference in insertion loss should be greater than about 36 dB.

Another problem is providing the network with a broadband response over the entire frequency range of the television channels (in the United States from about 50 MHz to 550 MHz), such that minimal insertion loss is inserted, thereby avoiding degradation of other television channels (in addition to the jammed channel) which must pass through the network before reaching the subscriber's television receiver. This broadband response is affected by the circuits of the network which provide for cancellation of the signals at the jamming signal frequency to produce the notch.

A still further problem arises out of frequency shifts in the location of the jamming carrier due to operation at the head end and the transmission link (whether cable, satellite or other transmission means). There may also be shifts in the notch frequency itself. The notch must be sufficiently wide so as to accommodate such frequency shifts. In other words, the frequency accuracy of the jamming carrier and the band width of the jamming carrier, for example if a modulated jamming carrier is used as described in the above identified patent, must be accommodated. Such frequency accuracy and band width requirements dictate a notch of at least about 30 to 40 KHz in width.

All of the foregoing problems are exacerbated by temperature changes. Even though the temperature stability of SAW devices is higher than many other kinds of resonant circuit elements, their resonant frequency changes with temperature as does the phase shift through the element. This can cause a reduction in the depth of the notch when balancing of signals in alternate network paths is required to maintain the notch depth and width. In other words, the characteristics of the SAW device with temperature determine the usable width of the notch as well as the depth of the notch. On a broadband basis the match between the circuits of the network which provide low insertion loss for any television signals which may be handled may also be adversely affected by temperature variations.

It is the principal object of the present invention to provide an improved network for the removal of jamming signals from premium subscription T.V. channels which has a narrow band response with a notch such that the jamming signal is removed without substantial attenuation of the picture carrier and which has a wide band response with minimum insertion loss over the entire television signal band width.

It is a further object of the invention to provide a network which is useful to remove the jamming signals from any channel which may be used to carry jammed premium programming across the entire band of television signals (e.g., from about 50 to 550 MHz).

It is a still further object of the present invention to provide a jamming signal removal network utilizing SAW devices which has both a narrow band response and a wide band response suitable for jamming signal removal without adverse affect on T.V. signals of the jammed channel or any other channel which must be transmitted through the network.

It is a still further object of the invention to provide an improved network for removal of jamming signals which are combined with T.V. signals at the locations of authorized subscribers which is compensated for adverse affects due to temperature variations, even where the network is located out of doors (off premises) so as to be under the influence of variations in ambient temperature as the seasons and weather changes.

Briefly described, a network for removing from a television signal, such as is distributed to CATV subscribers, a jamming signal which is combined with a television signal, which can be located over a broad T.V. signal transmission range, makes use of a SAW device having a frequency response with a narrow band insertion loss at the frequency of the jamming signal which is at least 100 times greater than the insertion loss at the frequency of the picture carrier of the television signal, which insertion loss stays above the value of at least about 100 times greater than the insertion loss at the picture carrier over a frequency range extending above and below the frequency of said jamming signal sufficient to accommodate shifts in frequency of said jamming signal with respect to the frequency response of the SAW device. Means are connected to the SAW device for providing a total insertion loss over the broadband T.V. signal transmission range of the network including the SAW element of less than about 1 dB, except over a frequency range of about ±24 MHz with respect to the frequency of the jamming signal where the loss is less than about 3 dB.

The foregoing and other objects, features and advantages of the invention as well as a presently preferred embodiment thereof will become more apparent from a reading of the following description in connection with the accompanying drawings in which.

Figure 5:
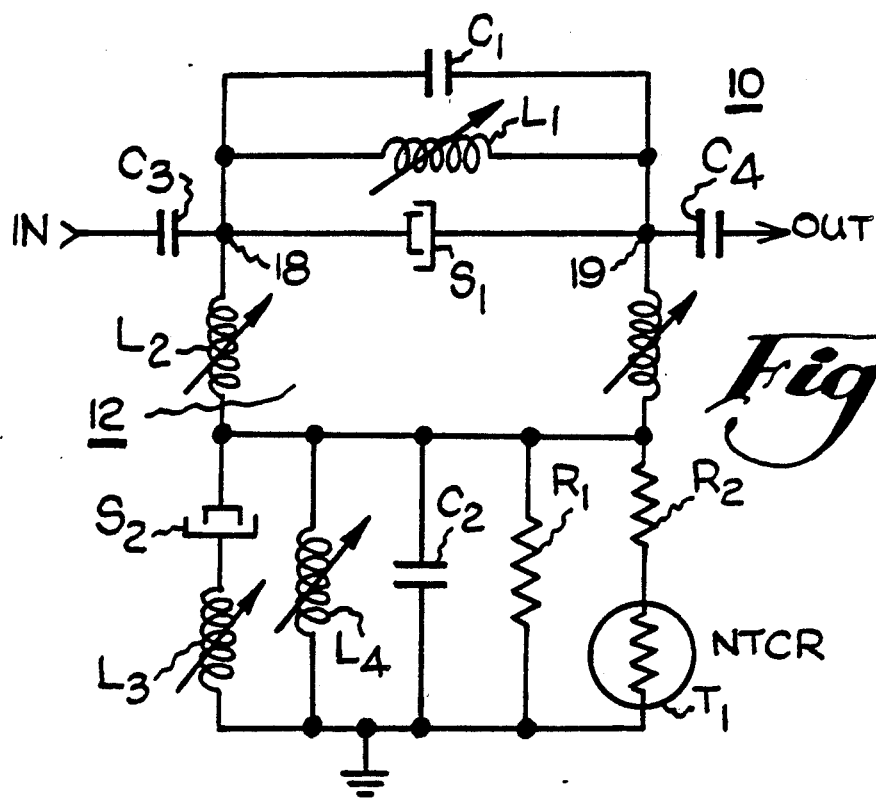

FIG. 5 is a schematic diagram of a network of for removal of jamming signals combined with television signals in accordance with a presently preferred embodiment of the invention (it being appreciated of course that the resonant frequency of the SAW devices and the values of the inductors and capacitors depends upon the channel for which the network is designed, each channel covering a different frequency band), the circuit also being compensated for temperature variations which might be expected when it is installed outside of the premises of the subscriber.

Figure 1:
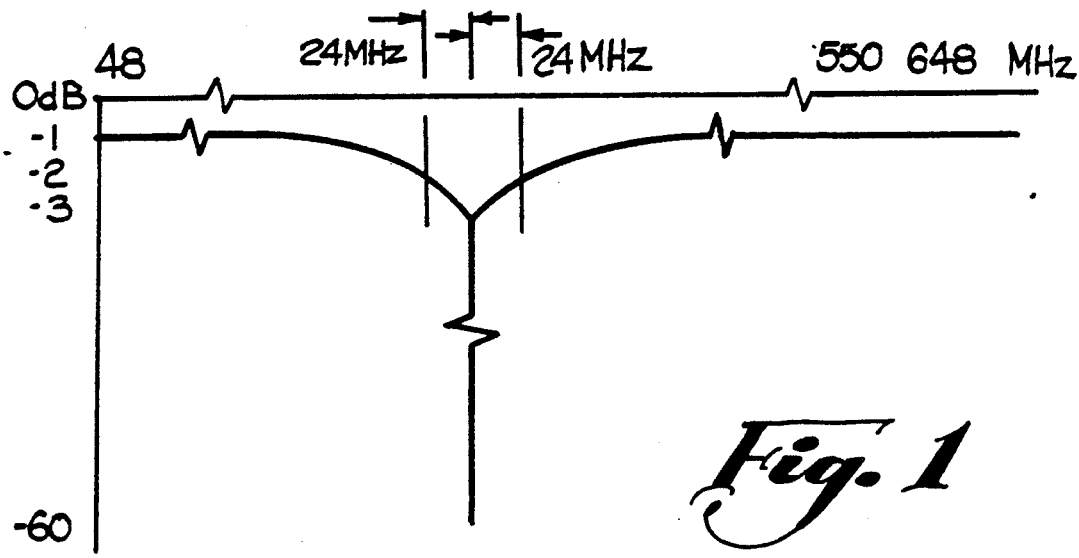
FIG. 1 is a diagram of the frequency response of a network provided in accordance with the invention over a broad band of frequencies which includes the frequencies of television signal transmission (of all of the television channels presently authorized) of CATV Systems.

Referring to FIG. 1 there is shown the broad band response of a network provided in accordance with the invention which is designed for the removal of a jamming signal of a particular channel. The network, an illustrative design of which is illustrated in FIG. 5, includes a series SAW device S1 and a shunt element S2. The series SAW device S1 is embedded in an all pass network including a first parallel resonant circuit 10 having a capacitor C1 and an inductor L1. The inductor L1 as well as all other inductors in the circuit are tunable, as with iron cores or slugs, as is indicated by the arrow through the inductor symbol. The all pass network includes a second resonant circuit 12 of "T" configuration. The top of the "T" is provided by inductors L2 and L3 which may be of equal inductance value or a single inductor which is center tapped. The leg of the "T" includes the second SAW device S2 which may be connected in series with an (optional) inductor L5. A inductor L4 and capacitor C2 complete the "T" section of the all-pass network.

A temperature compensating circuit 16 includes a shunt resistor R1 and series connected resistors R2 and thermistor T1, which is a negative temperature coefficient resistor, "NTCR". The fixed resistors R1 and R2 modify the thermistor T1 temperature characteristic so as to correct for the variation in resonant frequency and phase shift with temperature through the SAW devices S1 and S2. When the SAW devices are single phase unidirectional type, for example as shown in U.S. Pat. 4,577,168 issued Mar. 18, 1986, the thermistor T1 may have a nominal value (at room temperature of seven thousand ohms. R1 may be approximately thirteen thousand ohms (about twice the nominal value of the thermistor) and R2 may be approximately 390 ohms.

As shown in FIG. 1 the all-pass network 10 and 12 result in a insertion loss around the general area of the notch (+24 MHz from the center of the notch) which does not exceed about 3 dB. The insertion loss over the vast majority of the band is less than about 1 dB. This is due to a slight mismatch in the Q's of networks 10 and 12 and the inductance of the shunt inductor L4. The insertion loss is also due to the temperature compensating network 16. The optional inductor L5 serves to reduce the loss in the vicinity of the notch (over the ±24 MHz range) by providing for a better Q match of the networks 10 and 12.

Since the insertion loss over the entire range is minimal, the level of the TV signals will not be degraded (especially near notch). Distribution systems wherein jamming signal removing networks such as shown in FIG. 5 are connected in cascade are also facilitated since several maybe connected without excessive degradation of the TV signal levels.

Figure 2:
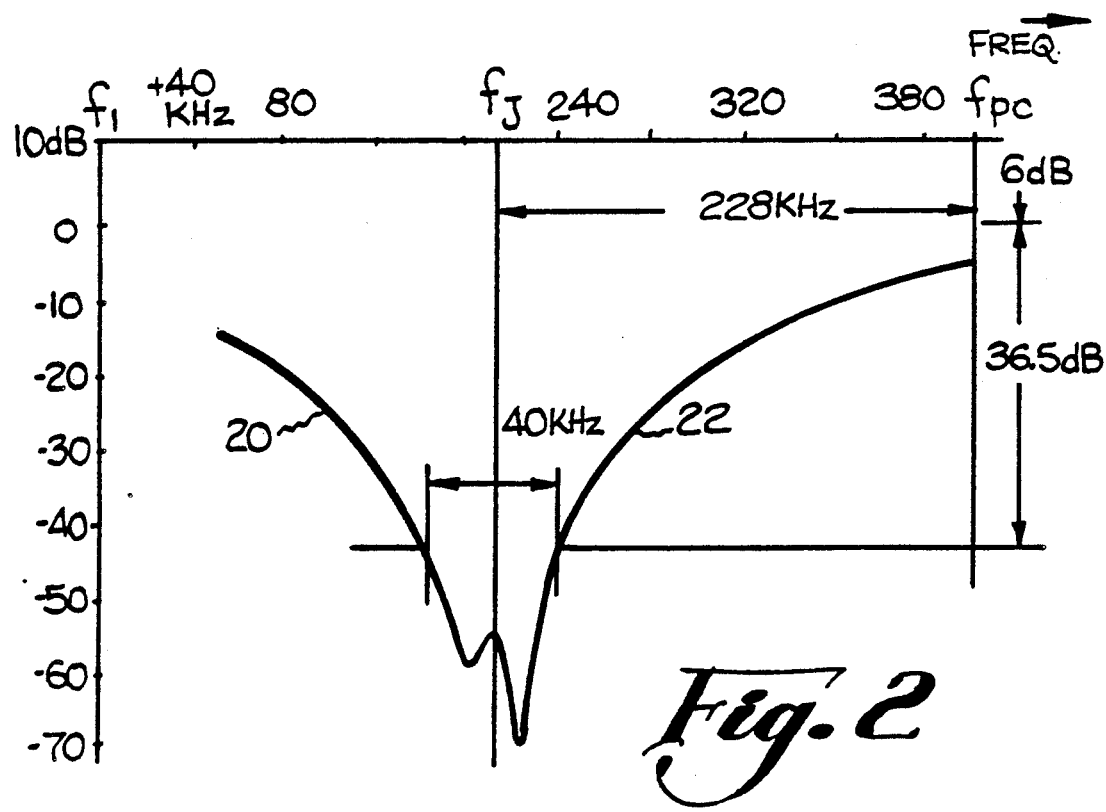
FIG. 2 is a diagram illustrating the narrow band response of a network provided in accordance with the invention.

The narrow band response as shown in FIG. 2 shows the jamming frequency $f_J$ to be approximately 228 KHz below the picture carrier frequency $f_{PC}$. This places the jamming signal in the null of the horizontal sync spectrum and affords the advantages described in the above referenced patent. Because the circuits 10 and 12 maintain the same transmission loss and stay 180° out of phase over essentially a 40 KHz band centered at the jamming signal frequency, $f_J$, the notch depth is maintained. The depth is greater than 36.5 dB at the jamming frequency below the insertion loss at the picture carrier frequency. Not only does the resonant frequency ($f_r$) of the SAW devices shift, as shown in FIG. 3, but the phase shift of signals transmitted through the SAW devices (S1 or S2) also shifts.

It will be noted that the resonant frequency variation (delta $f_r$) is approximately 30 KHz and is much greater as the temperature decreases than as the temperature increases. The frequency shift, delta $f_r$ is only 5 KHz from 30 to 60 degrees centigrade, but is almost 30 KHz as the temperature decreases to minus 40 degrees centigrade.

Variations in $f_r$ over a temperature range which may be encountered, even in off premises location of the network, are relatively small. However the phase variations over this range are large enough to affect the filter response. Any phase variations cause an unbalance in the signals transmitted through the SAW device S1 with respect to the signals transmitted through the other circuits 10 and 12; resulting in a lack of balance and a reduction in the depth of the notch.

Figure 3:
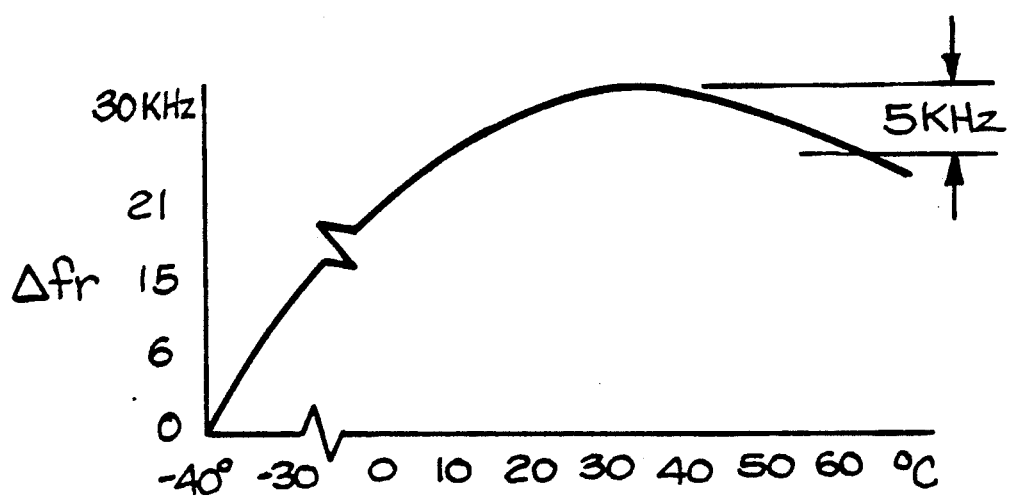
FIG. 3 is a curve showing the shift and the resonant frequency of a SAW device with temperature.
Figure 4:
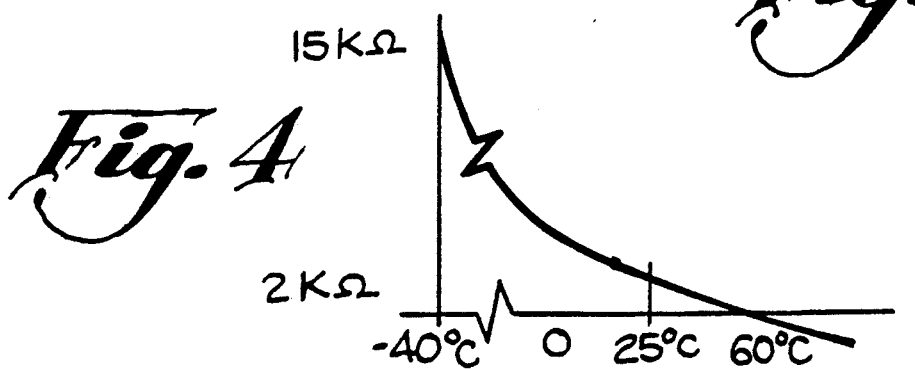
FIG. 4 is a curve illustrating the variation in resistance of the temperature compensating resistor circuit used to compensate for the affect of the temperature on a SAW device.

The resistive network 16 has a temperature versus resistance characteristic as illustrated in FIG. 4 which is the inverse of the frequency shift characteristic shown in FIG. 3. This causes a sufficient phase shift in the network 12 to follow the Phase shift through the SAW element S1 and maintains the depth of the notch over the temperature range of interest.

It will be observed from FIG. 2 that the notch stays about 40 KHz wide and the insertion loss remains more than 36.5 dB below the loss at the picture carrier frequency $f_{PC}$. FIG. 2 shows measured values of insertion loss and illustrates that the insertion loss will remain more than 40 dB below the insertion loss at the picture carrier over a range of approximately 30 KHz throughout the notch.

The all-pass network also assist in maintaining the skirts, shown at 20 and 22 in FIG. 2, relatively straight such that the insertion loss at the picture carrier is limited approximately 6 dB.

The second SAW device S2 in FIG. 5 is resonant at the jamming signal frequency. It introduces, at resonance, an extra loss element which matches the loss of the series SAW element S1, such that the broad band loss (see FIG. 1) even in the region of 24 MHz about the jamming frequency, remains less than 3 dB. In other words the shunt SAW device S2 provides for a narrower notch than with a series SAW device, such as the element S1, alone.

Returning to FIG. 5 it will noted that there are additional capacitors C3 and C4 connected in series with the input and output terminals 18 and 19 of the network. These capacitors are optional. They may be used to improve the impedance match (e.g., to 75 ohms) and to protect the circuit from surges.

In summary, the notch center frequency is the defined where the parallel resonant circuit of C1, L1 and S1 are resonant. L2, L3, L4, L5, C2 and the inherent or static capacity of S2 form a band pass filter which has its center frequency at the resonant frequency of C1, L1 and S1. The combination of the networks 10 and 12 provide the all pass network with minimum insertion loss except in the notch. The Q's of the circuits 10 and 12 are desirably matched. They are desirably high Q circuits with Q's of at least 70.

From the foregoing description it will apparent that there has been provided an improved network for removing jamming signals for authorized subscribers of a CATV system. Variations and modifications in the herein described network, within the scope of the invention, will undoubtedly suggest themselves to those skilled in the art. Accordingly the foregoing description should be taken as illustrative and not in a limiting sense.

We claim:

1. A network for removing from a television signal, such as is distributed to CATV subscribers, a jamming signal combined with the television signal, the television signal having a picture carrier which can be located over a broad band television signal transmission range, which network comprises means including a surface acoustic wave (SAW) device having a frequency response which shifts with temperature and including a temperature compensation means, said device and said compensating means cooperatively providing a substantially constant frequency response with variations in temperature of said network with an insertion loss over a narrowband, much narrower than the broad band of said television signal, said narrow band insertion loss being within a range about 40 KHz, which, at the frequency of the jamming signal, is at least about 100 times greater than the insertion loss at the frequency of said picture carrier and is approximately at least 36 dB below the insertion loss at the picture carrier, and which insertion loss is greater than about 36 dB over a frequency range extending above and below the frequency of said jamming signal a sufficient range to accommodate said shifts in the frequency response of said device with respect to the frequency of said jamming signal, and said network further comprised means connected to said device for providing a total insertion loss over said broad band range of said network including said device of less than about 1 dB except over a frequency range of about ±24 MHz with respect to the frequency of said jamming signal where said loss is less than about 3 dB.

2. The network in accordance with claim 1 wherein said means for providing said total insertion loss over said broad band range comprises an all pass network in which said device is embedded.

3. The network according to claim 2 wherein said network has input terminals and output terminals, said device being connected in a circuit path in series between the input and output terminals.

4. The network according to claim 3 wherein said network has a second SAW device connected in another circuit path in shunt with said series circuit path.

5. The network according to claim 2 wherein all pass network includes a temperature responsive network.

6. The network according to claim 5 wherein said temperature responsive element has a negative temperature coefficient of impedance and is connected in a circuit path in shunt with said series path.

7. The network according to claim 6 wherein said SAW device has a frequency response which varies with temperature, said temperature responsive element has an impedance variation corresponding and inverse to the variation with temperature in frequency response of said SAW device in said network.

8. The network according to claim 7 wherein shunt circuit path includes a second SAW device connected across said temperature responsive element.

9. The network according to claim 8 wherein said shunt path also includes a parallel resonant circuit connected across said second SAW device and across said temperature responsive element.

10. The network according to claim 9 wherein an inductor is connected in series with said second shunt element, and said parallel resonant circuit and temperature responsive element are connected across the series connected second SAW device and inductor.

11. The network according to claim 10 wherein said temperature responsive element is a resistor contained in a resistive network including a first resistor connected across said second SAW device and across said first resistor, and a second resistor connected in series with the temperature responsive resistor.

12. The network according to claim 11 wherein the resistance value of said first resistor is about twice the resistance value of said temperature, responsive resistor at room temperature and said second resistor is about 5% of the value of said first resistor.

13. The network according to claim 3 wherein said all pass network comprises a first parallel resonant circuit connected across said SAW device, a second parallel resonant circuit of "T" shape with a top having a junction and a leg connected to said junction, said top being provided by inductive elements on both sides of said junction and being connected across said first named SAW device, said leg having connected in parallel a second SAW device, a second inductor, a capacitor, and a resistor circuit having a negative temperature coefficient resistor, said first resonant circuit and said first SAW device being resonant at said jamming signal frequency, and said second resonant circuit also being resonant at said jamming signal frequency.

14. The network according to claim 13 wherein the Q of said first resonant circuit including first said SAW device and the Q of said second resonant circuit are about equal.

15. The network according to claim 14 wherein a third inductor is connected in series with said second SAW device.

16. The network in accordance with claim 1 wherein said SAW device and total insertion loss providing means provide said insertion loss where said picture carrier and jamming signal frequencies are about 200 KHz apart.

17. The network according to claim 16 wherein said jamming signal frequency is in the vestigial sideband of said television signal.

18. The network according to the claim 13 wherein a capacitor through which said combined jamming and TV signal passes is connected to said input terminal, and another capacitor through which the TV signal with said jamming signal substantially removed passes connected to said output terminal.

* * * * *